United States Patent [19]

Sager et al.

[11] Patent Number: 5,647,228
[45] Date of Patent: Jul. 15, 1997

[54] APPARATUS AND METHOD FOR REGULATING TEMPERATURE IN A CRYOGENIC TEST CHAMBER

[75] Inventors: Ronald E. Sager, Carlsbad; Stefano Spagna, La Jolla, both of Calif.

[73] Assignee: Quantum Design, Inc., San Diego, Calif.

[21] Appl. No.: 679,553

[22] Filed: Jul. 12, 1996

[51] Int. Cl.[6] .................................................. F25J 1/00
[52] U.S. Cl. .......................... 62/656; 62/49.2; 62/51.1
[58] Field of Search ................................ 62/51.1, 49.2, 62/656

[56] References Cited

U.S. PATENT DOCUMENTS

| | | | |
|---|---|---|---|
| 3,729,946 | 5/1973 | Massey | 62/51 |
| 4,192,147 | 3/1980 | Gilbert et al. | 62/49 |
| 4,280,499 | 7/1981 | Squazzi | 128/303.1 |
| 4,302,943 | 12/1981 | Niemann et al. | 62/49 |
| 4,485,640 | 12/1984 | Mardion et al. | 62/514 R |
| 4,495,782 | 1/1985 | Salour et al. | 62/514 R |
| 4,578,963 | 4/1986 | Sitte | 62/514 R |
| 4,607,490 | 8/1986 | Seidel et al. | 62/51 |
| 4,791,788 | 12/1988 | Simmonds et al. | 62/49 |
| 4,848,093 | 7/1989 | Simmonds et al. | 62/49.1 |
| 4,918,928 | 4/1990 | Morioka et al. | 62/51.1 |
| 5,275,007 | 1/1994 | Neeser | 62/51.1 |
| 5,417,072 | 5/1995 | Silver et al. | 62/51.1 |

OTHER PUBLICATIONS

S.H.E. Conductus – *Sequence of Temperature Control System Hardware* (Date Unknown ).

*Primary Examiner*—Ronald C. Capossel
*Attorney, Agent, or Firm*—Baker, Maxham, Jester & Meador

[57] ABSTRACT

A dual capillary inlet cryogenic test chamber having the ability to continuously regulate temperature between about 1.5 K. and 400 K. A controllably heated capillary tube is located in the cryogenic reservoir, spaced from the test chamber and thermally insulated from the cryogen. This capillary tube has a characteristic impedance to fluid flow. A second low temperature, high impedance capillary tube inlet is also in the cryogenic reservoir and is connected between the cryogen reservoir and the test chamber. The combination of a control system with pressure and temperature feedback, combined with the two inlet tubes of different impedance, enables the apparatus to operate continuously and stably at any temperature within its operating range, or to smoothly sweep through any predetermined temperature range.

16 Claims, 5 Drawing Sheets

APPARATUS AND METHOD FOR REGULATING TEMPERATURE IN A CRYOGENIC TEST CHAMBER

BACKGROUND

1. Field of the Invention

This invention relates generally to temperature regulation and more particularly to an apparatus and method for regulating the temperature in a cryogenic test chamber to smoothly increase or decrease the temperature in the test chamber throughout its operative range, and to stably maintain any predetermined temperature within its operative range for indefinite periods of time.

2. Discussion of the Prior Art

The need for testing specimens of various types for different properties has increased substantially over the last several years. Different methods have been devised to accomplish such tests at low (cryogenic) temperatures. Temperature regulation in a cryogenic test chamber demands a sophisticated balance between supply and loss of thermal energy. A measure of the efficiency of a specific control scheme is the width of the temperature range over which control can be maintained, and the duration and stability achieved at any temperature in this range. In general, two distinct control modes of operation must be employed to achieve accurate temperature regulation above or below the normal boiling point of the liquid cryogen (refrigerant) medium used in a cryogenic vessel. This temperature is 4.2 K. for liquid helium ($^4$He) a frequently employed cryogen. Temperature regulation in the vicinity of the normal boiling point, however, is particularly difficult because of the large change in thermal properties (i.e. specific heat) of the liquid itself which undergoes a liquid-to-gaseous transition in this temperature region. Temperature oscillations causing thermal instability are the most common problem encountered when trying to control temperature at the normal boiling point of the cryogenic liquid and, in general, when switching between low and high temperature control modes.

When regulating temperatures above the normal boiling point of the liquid refrigerant it is common to supply heat to the test chamber to effectively maintain and control a desired temperature. Because it is rather uneconomical to use the reservoir as a direct source and then regulate the test chamber at higher temperatures, it is common to thermally isolate the test chamber from the surroundings at a lower temperature. Temperature control is then achieved by drawing a small fraction of the liquid cryogen through a passageway such as a coupling tube into the test chamber from the remainder of the cryogenic vessel maintained under a slight overpressure. The pressure difference between the test chamber and the cryogen reservoir effectively provides the sole injection mechanism of the liquid cryogen into the coupling tube and through the test chamber required for temperature control. The fluid reaching the interior of the test chamber is then heated to the desired temperature and the vapor flows through the test chamber to provide uniform temperature control. While this control scheme is suitable for high temperature regulation, its thermal response near the vicinity of the normal boiling point of the cryogenic fluid is rather poor because of the difficulty of controlling the vapor flow rate passively by the overpressure that exists in the cryogenic vessel alone.

When temperatures below the normal boiling point of the liquid refrigerant are required, a second category of methods which continuously extract heat from the test chamber is employed. In these methods the temperature of the test chamber is decreased by applying a vacuum to the vapor above the liquid phase of the cryogenic fluid, thereby decreasing its boiling point temperature. For practical applications where liquid $^4$He is used as the cryogenic medium, the test chamber, reaching lower temperatures than its surroundings, is again thermally isolated from the main bath in the cryogenic vessel. This is because it is very uneconomical to just pump the vapor above the liquid helium bath in the cryogenic vessel, since about 40% of the liquid must be evaporated to cool it from 4.2 to 1.5 K. due to the large change in specific heat over this temperature range. Greater efficiency is thus achieved by leaving the main part of the liquid helium at its normal boiling point and pumping only a small amount of helium previously drawn from the main bath into the test chamber. The liquid $^4$He accumulated in the test chamber is then evacuated to a suitable pressure such that the liquid helium boils at the desired control temperature. However, in most practical applications, because of the limited volume available in the test chamber to accumulate the cryogen in liquid form (typically 10 to 20 cubic centimeters), temperatures below the normal boiling point of the liquid $^4$He can be regulated only for a limited period of time, in some cases 40 to 50 minutes at the lowest temperatures. When all the liquid cryogen collected in the test chamber has been boiled away the control system must re-initiate the filling process to draw more of the liquid cryogen into the test chamber, thus interrupting effective temperature control. Only when enough liquid cryogen has been recollected in the test chamber can the desired temperature be again reached and regulated. By selecting a suitable underpressure and continuing to evacuate the test chamber as the liquid boils so as to maintain that pressure, any desired temperature down to about 1.5 K. can be reached. An example of such cryogenic test apparatus prior art device is shown in U.S. Pat. No. 4,848,093.

That patent discloses an apparatus for regulating the temperature in a test chamber in a cryogenic vessel at any temperature between about 1.5 and 300 K. by means of a controllably heated capillary tube spaced apart from the test chamber but still located within the cryogenic fluid in the cryogenic vessel. The capillary tube regulates the flow of fluid from the cryogenic vessel into the test chamber to permit any desired temperature to be achieved in the test chamber. In a high temperature mode of operation, the heated capillary tube supplies the cryogenic fluid in gaseous form and prevents any fluid in a liquid phase from entering the test chamber. In the low temperature mode, below 4.2 K., the capillary tube is heated to such an extent that very little flow of gas to the test chamber is permitted after the test chamber has been charged with liquid cryogen.

Figure 1:
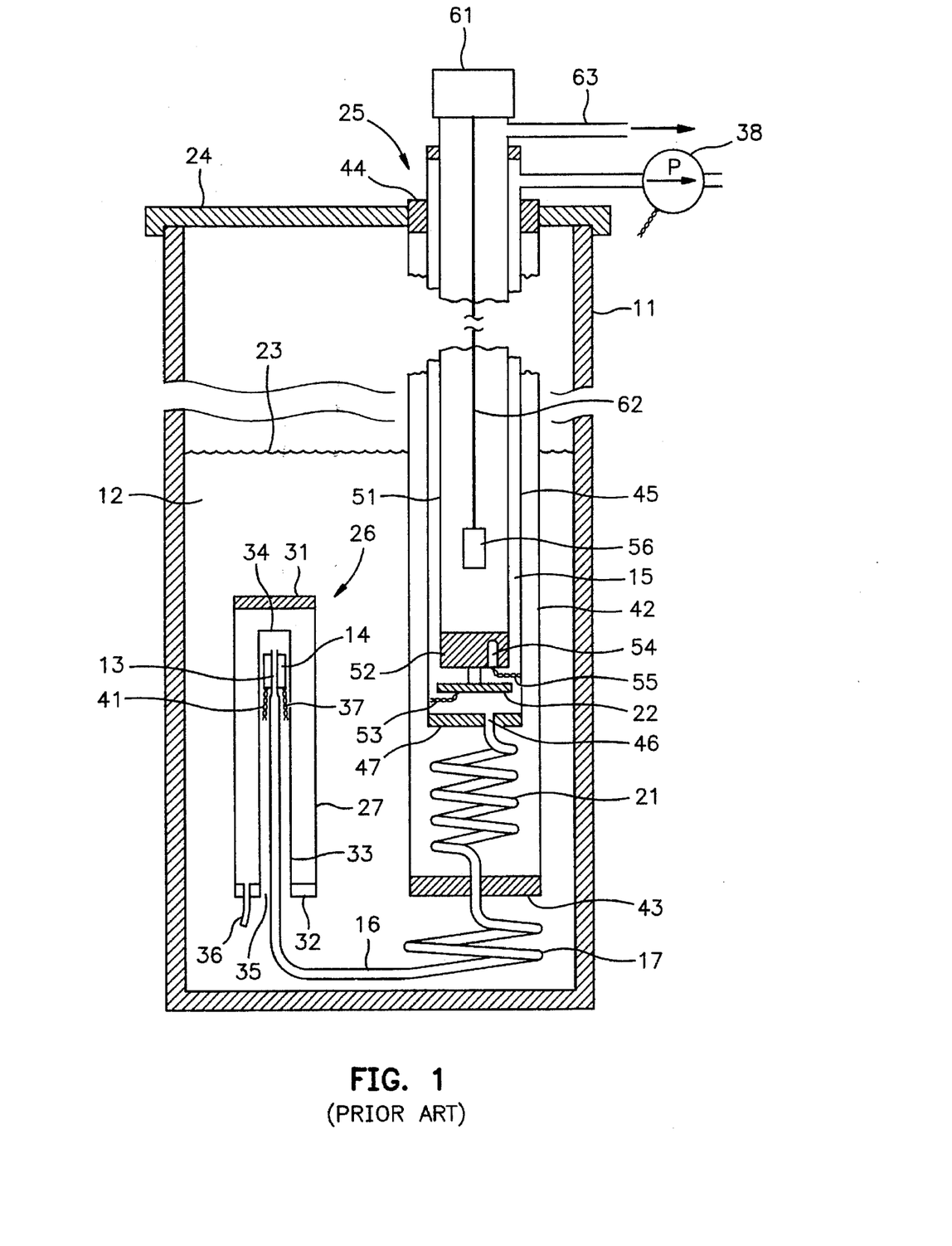
FIG. 1 is a sectional view of a cryogenic vessel containing a cryogenic liquid and temperature regulation apparatus according to the prior art.

This prior art apparatus is shown here in FIG. 1, where the temperature regulation apparatus includes cryogenic vessel 11 adapted to contain a reservoir of fluid 12 in a liquid phase at a cryogenic temperature, capillary tube 13 located in the cryogenic vessel, capillary heater means 14, test chamber 15 in the cryogenic vessel but spaced apart from the capillary tube, coupling tube 16, coil 17 and coil 21 defining a fluid flow path between the capillary tube and the test chamber, test chamber heater 22, and evacuation means 38, typically comprising a pump whose throughput is regulated by a variable flow valve and appropriate pressure sensors and readout, to partially evacuate the test chamber to draw fluid from the cryogenic vessel through the capillary tube, the coupling tube and the coils into the test chamber. Appropriate microprocessor controls are employed to relate heater and vacuum pump operation to temperature readings.

The apparatus of this prior art patent regulates the temperature in the test chamber by maintaining the fluid therein at a desired temperature. In a high temperature mode, the capillary heater warms the capillary tube sufficiently to boil any liquid flowing therein, changing the phase of the fluid from liquid to gas as the fluid is drawn through the capillary tube into the test chamber. The test chamber heater warms any gas in the test chamber to the desired temperature and then the gas moves upwardly to provide uniform temperature control along or throughout the test chamber.

In a medium temperature mode (at about 4.2 K.), the fluid remains in its liquid phase without undergoing any net change in temperature as it is drawn through the capillary tube into the test chamber. The fluid is thereby maintained at the cryogenic temperature in the test chamber.

In a low temperature mode, the fluid remains in its liquid phase as it is drawn through the capillary tube into the test chamber until a reservoir of liquid has accumulated to the desired level in the test chamber. Then the capillary heater quickly warms the capillary tube sufficiently to effectively create a gas bubble or a vapor lock, thereby substantially preventing the flow of any more fluid through the capillary tube. The evacuation means thereupon reduces the pressure in the test chamber sufficiently to lower the boiling temperature of the liquid therein to the desired temperature and continues to evacuate any gas produced as the liquid boils, thereby maintaining the liquid at the desired temperature below 4.2 K.

The time required to reduce the test chamber temperature from room temperature (about 300 K.) to the low cryogenic temperature of about 1.5 K. with this prior art apparatus would be about 30 minutes in typical circumstances. Then that low temperature can only be maintained for about 30–60 minutes before refilling and recycling is necessary according to that prior art teaching.

While this apparatus worked well for many purposes, it was not possible to maintain cryogenic temperatures at a controlled level below 4.2 K. for long periods of time, for example, for several hours or even indefinitely. Some tests cannot be completed in the 30–60 minutes afforded by such prior art devices before recycling was necessary. Of course, losing the temperature stability can affect the specimen itself, resulting in inaccurate test data.

A first step which has been suggested to extend the temperature range of the cryostat is by providing a combination of a thermally isolated small capillary inlet having a suitable flow impedance and a second inlet to the test chamber reservoir regulated by a mechanical valve in the cryogenic vessel at the inlet of the temperature controlled test chamber. In this way it is possible to use a small capillary to allow continuous filling of the reservoir below 4.2 K. when the valve is closed and, in addition, obtain large flows through the second inlet to allow rapid cooling when the valve is open. Unfortunately, the difficulty of constructing reliable cryogenic valves has limited the commercial usefulness of this approach. An alternative which has been employed is to remotely locate the mechanical valve outside the cryogenic vessel. This configuration requires an inlet which is re-routed outside the cryogenic vessel through the mechanical valve.

Although this apparatus in principle allows a range of temperatures from about 1.5 K. to 400 K. to be achieved (if liquid $^4$He is employed), its regulation at temperatures in the vicinity of 4.2 K. is rather poor. The long inlet utilized in this configuration introduces long waiting periods of time to maintain and regulate temperatures. While this may not constitute a serious problem at temperatures above or below the boiling point of $^4$He, significant instabilities occur near 4.2 K. where quick thermal changes of the properties of the liquid require a fast control temperature mode.

The purposes for conducting tests of specimens at cryogenic temperatures, or at any temperature which must be maintained at some level between about 1.5 K. and 400 K., are many and varied. There may be life tests, where observations over periods of days or weeks would be accomplished if it were possible to do so. Detailed characterization of magnetic or physical properties of a new or unknown test specimens may require temperature sweeps between 15 and 400 K., or within any included sub-segments of temperature limits. Because the onset of important intrinsic physical properties of the test specimen material may occur suddenly or as a discontinuity at any temperature, it is important that temperatures be controlled smoothly as they are changed through the operating range. In addition, elaborate tests may require extended measurement time even at the lowest temperature achieved by the apparatus. For this reason it is important that temperatures be continuous, that is, that they can be maintained indefinitely. No known integrated prior art apparatus can accomplish all these purposes, that is, the ability to cycle back and forth smoothly between about 1.5 and 400 K. and to selectively indefinitely maintain any set temperature within that range.

SUMMARY OF THE INVENTION

The primary purpose of this invention is to provide cryogenic test apparatus which enables smooth, continuous cycling of test chamber temperatures from a low of about 1.5 K. to a high of about 400 K. and, in the same apparatus, the ability to quickly achieve any desired high or low temperature and to stably maintain any such temperature for indefinite periods of time.

This apparatus includes a thermally insulated, variable temperature impedance capillary which preconditions the cryogenic fluid before it flows into the insulated test chamber. A second, higher impedance capillary provides the main source of cryogenic fluid in liquid phase in the test chamber as required for continuous operation at low temperatures (below 4.2 K. for $^4$He). The novel combination of this invention provides the ability to produce and continuously maintain temperatures in the test chamber over a range of about 1.5 to 400 K., and to smoothly cycle through the entire range of 1.5 to 400 K.

The apparatus of this invention employs the basic structure and operation of the cryogenic test apparatus of U.S. Pat. No. 4,848,093, as described above, with a major difference. In addition to the first temperature controlled capillary tube feeding into other tubes which pass through the cryogenic fluid reservoir as it leads to the test chamber, a second capillary tube leads directly from the cryogenic fluid reservoir through only a protective filter to the test chamber. Substantially all of the length of this second capillary tube is thermally and physically isolated from the cryogenic fluid in the cryogenic vessel. The second cryogenic fluid input and appropriate enhanced controls enable any desired temperature to be achieved and indefinitely maintained in the test chamber within the entire range of 1.5 to 400 K. The second cryogenic fluid input or impedance is, except for its input end, maintained separate and isolated from the cryogenic fluid bath in the cryogenic vessel. It has an impedance to cryogenic fluid flow which is much higher than the impedance of the first capillary tube. Because of the relative impedances of the two fluid flow means feeding from the cryogenic vessel into the test chamber, this invention enables the stable maintenance of any temperature within its test range and facilitates smooth cycling of the test chamber temperature from the low end to the high end of the range.

The combined method of operation of the two fluid flow impedance means, when controlled by appropriate microprocessor control apparatus, enables the full range of test temperatures to be realized. At temperatures above about 4.2 K., the test chamber is subject to a relatively small underpressure and the first capillary tube is heated sufficiently so that all of the cryogenic fluid passing through the capillary tube and into the test chamber will be in gaseous form. Then the test chamber heater can raise the temperature of that gas in the test chamber to any desired level and maintain that temperature. Because of the relatively high impedance of the second capillary tube in relation to the impedance of the first capillary tube, very little cryogenic fluid in liquid form will be drawn into the test chamber through the second capillary tube in the high temperature mode. When low temperature operation is desired (between 1.5 and 4.2 K.) a substantially higher level of underpressure is maintained in the test chamber while the first capillary tube is heated to a much higher level, creating a gas bubble therein and preventing all but a very small amount of gas to flow from the first capillary tube into the test chamber. Cryogenic fluid in liquid form is continuously drawn directly through the second capillary tube into the test chamber and, by adjusting the level of vacuum, will arrive in the test chamber at a lower temperature than 4.2 K. For this reason the desired temperature may be achieved in a relatively short period of time when cooling from high temperatures at any level between about 1.5 and 4.2 K. and then that temperature can be maintained indefinitely.

As for cycling between any two temperature points within the operational limits of the apparatus, the limits being about 1.5 to 400 K., the microprocessor control operates in rapid feedback fashion with the temperature sensors, the heater elements and the vacuum pump, to smoothly transition throughout the desired range of temperatures in the test chamber.

BRIEF DESCRIPTION OF THE DRAWING

The objects, advantages and features of the present invention will be more readily perceived from the following detailed description when read in conjunction with accompanying drawing, in which.

DETAILED DESCRIPTION OF THE PREFERRED EMBODIMENTS

The present invention provides an apparatus and method for continuously regulating the temperature of a test chamber in a cryogenic vessel at any level between about 1.5 and 400 K. by means of a dual capillary inlet configuration. This is accomplished using a constant flow supply of refrigerant medium to the test chamber in a gaseous or a liquid phase and by maintaining the medium therein at a desired temperature. The method for temperature regulation in the test chamber according to the present invention actively controls the supply of liquid refrigerant by partially evacuating the interior of the test chamber to create a normal steady state pressure difference from the remainder of the cryogenic vessel at approximately 1 psi over atmospheric pressure or 16 psi on an absolute scale. This technique, when coupled with the novel integrated dual inlet apparatus, results in a quick thermal response of the system, facilitating temperature control and stability in the vicinity of the normal boiling point of the liquid refrigerant, and eliminating oscillations and thermal hysteresis normally encountered when switching between the high and low temperature control modes.

The apparatus of the present invention operates using the basic system and teaching of U.S. Pat. No. 4,848,093, but with significant improvements and modifications to enable it to maintain low temperature operation substantially indefinitely, to sweep through any range of temperatures within its operating temperature capability smoothly and continuously and to maintain any other temperature in a stable fashion at, above, or below the normal boiling point of the cryogenic fluid. One significant advantage of the present invention is that it does not operate on a batch basis, which would require refilling or recycling. The batch basis operation of some prior art devices permits the internal temperature of the specimen to change erratically within the test chamber during the recycling process. Not only does the present invention enable more efficient operation because there are no recycling interruptions, but the measurements and readings are much more accurate because the specimen being tested stays at the testing temperature throughout the test. Thus, the testing procedure affects the specimen less than do prior known cryogenic test apparatuses, avoiding spurious test data, while enabling the panoply of operating modes, ranging from a low temperature of about 1.5 K. to a high temperature of about 400 K. and being able to smoothly cycle through any portion of that operating range.

Figure 4:
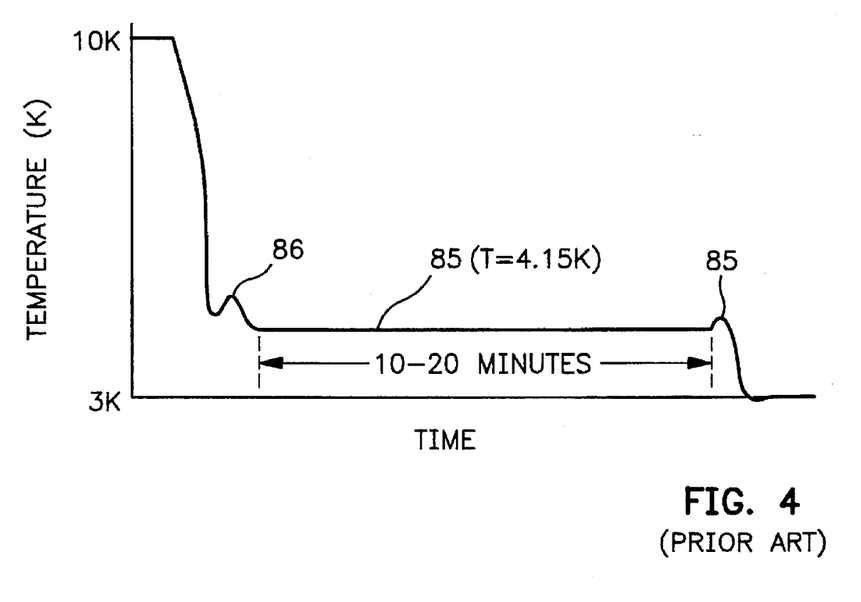
FIG. 4 is a plot of temperature (Kelvin) versus time for a typical prior art temperature regulating apparatus as it lowers test chamber temperature.
Figure 5:
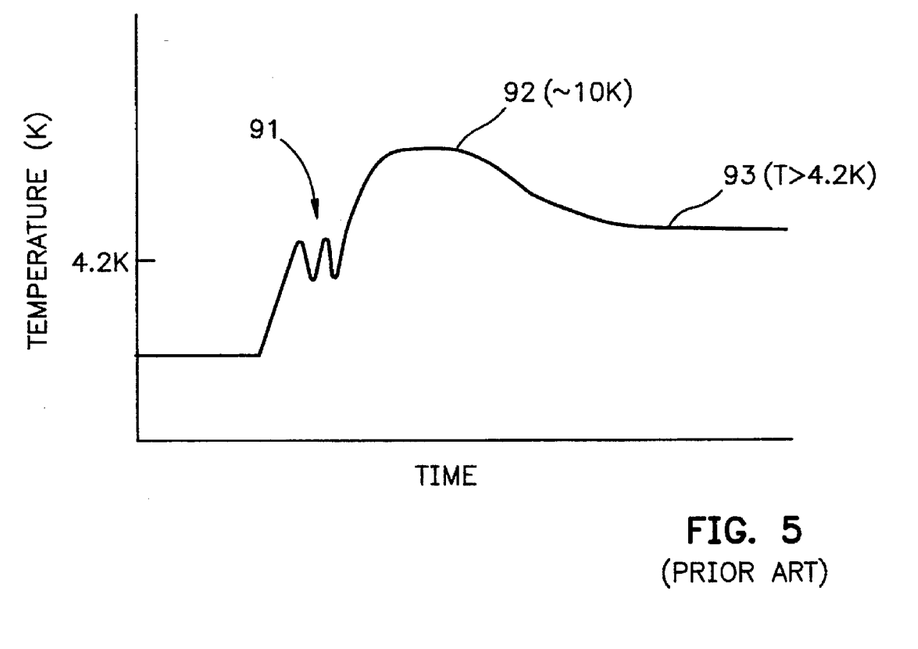
FIG. 5 is a plot of temperature versus time for the FIG. 4 prior art apparatus as it raises test chamber temperature.
Figure 6:
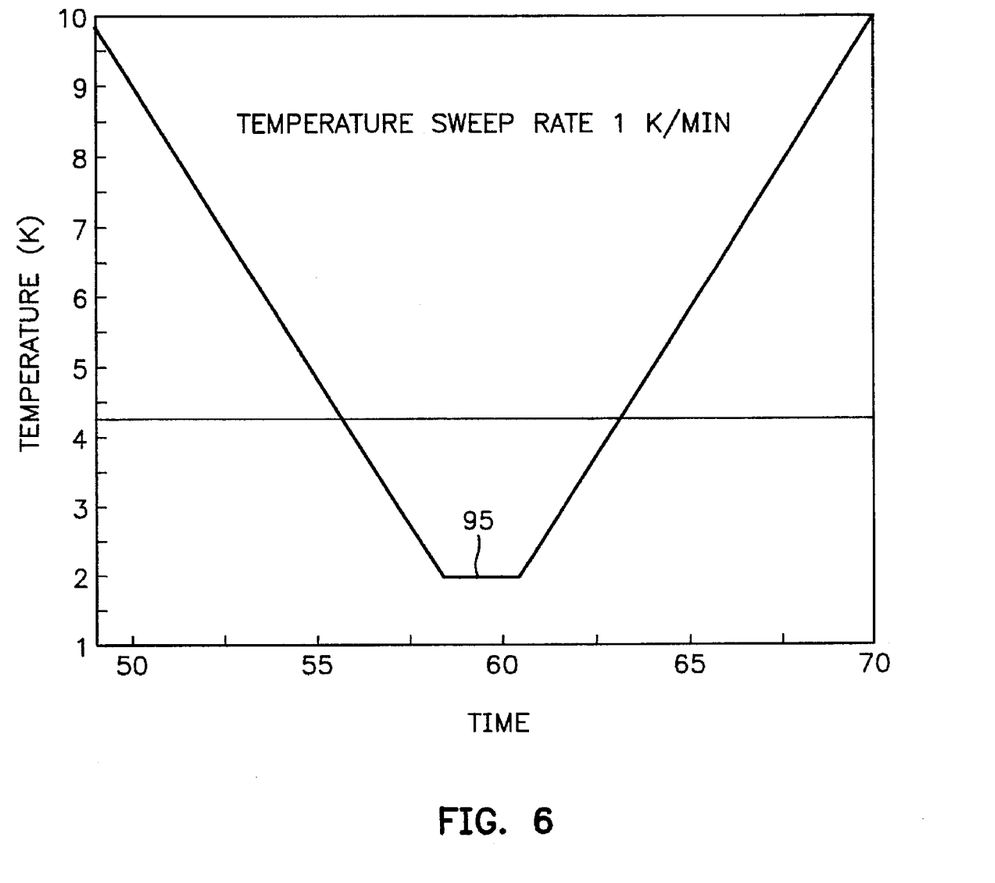
FIG. 6 shows the temperature versus time plot of the present invention as it raises or lowers test chamber temperature.

The temperature versus time plots of FIGS. 4–6 illustrate the limitations of the prior art and how favorably the present invention compares. FIG. 4 shows how non-linear are the test chamber temperatures as they decrease from 10 K. down to about 3 K. with typical prior art apparatus. From a steady state 10 K. there is a relatively quick drop to about 4.2 K., with a recovery or bounce 86 occurring as the temperature passes through 4.2 K. Then there is long intermediate state 85 where liquid cryogen is charged into the test chamber before the temperature can be reduced below 4.2 K. As cryogen flow through the variable impedance is cut off, there is a slight rise 87 and then a steady reduction to 3 K. as shown here. Of course, the length of time that sub-boiling point temperatures can be maintained is limited.

FIG. 4 depicts recovery of the test chamber from below 4.2 K. to something higher than 4.2 K. Note the non-linearity and multiple bounces 91 as the temperature fails to move smoothly through 4.2 K. to a higher value. A temperature of about 10 K. is indicated at 92, which is non-linearly reduced to something higher than 4.2 K., shown at 93.

The plot of temperature decrease from 10 K. to about 2 K. and back again as is possible with the present invention is shown in FIG. 6. Note the linearity for the entire transition even as the temperature passes through 4.2 K. from either direction. Dwell time 95 at 2 K., or any other level below 4.2

K., may be indefinitely long. It is shown here only about two minutes long for exposition purposes only. The purpose of FIG. 6 is more to show the linear temperature transition capabilities of the present invention. The sweep rate through the temperature segment shown is about 1 K./min.

The prior art of FIG. 1 (from U.S. Pat. No. 4,848,093) will now be described in more detail. Cryogenic vessel 11 contains within it cryogenic fluid 12 having an upper surface 23. Vessel 11 includes gastight cover 24 having an opening through which cryostat 25 extends. Controllably heated (variable impedance) capillary tube 13 and its heating element 14 are contained within isolating impedance capsule 26. The entire capsule and fluid flow means 16, 17 and 21 extending from capillary tube 13 are maintained within vessel 11 and beneath surface 23 of cryogenic fluid 12. A reason that the entrance to coupling tube 16 through capillary tube 13 is isolated from the cryogenic fluid is to prevent unwanted heating of the fluid bath when the capillary is being heated for operational purposes.

Capsule 26 is preferably formed of tubular body 27 closed at the top end by cap 31, and at the bottom end by annular cap 32. Inner tube 33 extends through cap 32 and is closed at end 34 adjacent to and spaced from cap 31 of tube 27. Inner tube 33 has bottom opening 35 through which extends coupling tube 16. To provide insulation, the annular portion of tube 27 is evacuated by means of evacuation tube 36, the end of which is closed off during the manufacturing process. Heater 14 typically comprises resistance wires wrapped around capillary tube 13 which, when a current is applied by means of wires 37, quickly heats up the very small capillary tube. Wires 41 connected to the capillary tube represent a temperature sensor which is connected to the control means as will be described later.

Cryostat 25 comprises outer container or shell 42 closed at the bottom by means of cover plate 43 and having annular seal 44 at the top which tightly secures the cryostat to cover 24 and through which pass, in a sealing fashion, other elements of the cryostat. Fluid conduit 16, 17 extends through an appropriate sealed opening in bottom cover 43. Within shell 42 is test chamber 45 which is connected to the fluid conduit means from capillary 13 by end 46 of coil 21 extending through an opening in cover 47 of test chamber 45. Within test chamber 45 is sample tube 51 sealed at the bottom by means of plug 52. Extending beneath plug 52 within test chamber 15 is heating element 22, power being applied through wire 53. Mounted in plug 52 is temperature sensor 54 connected to the control means through wire 55. Reference numeral 56 refers to a sample to be tested by the apparatus of the invention, the sample typically being hung from top 61 by means of cable 62.

Sample tube or test vessel 51 is evacuated through outlet 63 by means of an appropriate vacuum pump (not shown). A thermally conductive, inert gas can then be admitted into sample tube 51 to provide thermal contact between specimen 56 and the walls of sample tube 51 which are in contact with the cryogenic fluid in test chamber 15. A typically used substance which maintains its gaseous phase at cryogenic temperatures which is thermally conductive is helium. Incidentally, the typically used cryogenic fluid is helium ($^4$He). The temperatures discussed herein related to helium as the cryogenic fluid. However, other cryogenic fluids may be used and their characteristic temperatures, specifically their boiling temperatures, would be adjusted as appropriate. The test chamber of the cryostat isolated from the cryogenic fluid reservoir by means of shell 42 which is evacuated to a background pressure of less than one millitorr and is preferably filled with some appropriate insulation material, such as aluminized Mylar or the like.

Capillary 13 within impedance chamber 26 effectively comprises the impedance aspect of cryogenic fluid flow from reservoir 12 into test chamber 15. The inner diameter of capillary 13 is about 0.1 mm and has a length of about 10 mm or less. Coupling tube 16 extending from capillary tube 13 has an inner diameter of about 0.6 mm. The diameter of inner tube 35 is typically about 1.4 mm and has a length of about 100 mm. These dimensions have been found to give satisfactory results although it will be apparent that other dimensions can be employed and that these are examples only. Of course, capillary tube 13 must be dimensioned to match the intended rate of mass flow of the fluid into the test chamber to provide the cooling power for the particular purposes of the apparatus of the invention. With the particular dimensions provided, a fluid flow rate of about one cubic centimeter of liquid helium per minute can be achieved when pumping hard (at about 1 mm of mercury or better) and no heat is provided by capillary heater 14 or heater element 22.

Capillary heater element 14 is preferably fabricated from material such as phosphor-bronze resistance wire having a diameter of about 0.08 mm. Temperature sensor 41 may be made from superconducting niobium-titanium alloy or the like (as explained in more detail below). Outer tube 27 of the impedance chamber may be formed of any suitable material such as brass, stainless steel, or the like. Inner tube 33 and coupling tube 16 are preferably fabricated from material having low thermal conductivity such as stainless steel or cupronickel (CuNi). Coupling tube 16 is optionally formed into first coil 17 remote from impedance chamber 26 but still within cryogenic fluid reservoir 12. This provides for cooling of fluid flowing through it from the capillary tube to the test chamber by the thermal contact it makes with the cryogenic fluid. The coupling tube also optionally includes second coil 21 within insulated container 42. This assists in achieving thermal insolation between test chamber 15 and cryogenic fluid 12.

As an example of the effectiveness of capillary heater 14, application of about 0.1 watt of electrical power to the heater coil will raise the temperature of capillary tube 13 to about 300 K. in a matter of seconds. Any lesser amount of electrical power can be applied to achieve lower levels of heat as necessary for operation of the apparatus as will be described in greater detail below.

In operation, for test chamber temperatures higher than the boiling point of the cryogenic fluid, which is 4.2 K. for purposes of discussion, sufficient heat is applied to capillary tube 13 to boil any liquid flowing therein. Note that the flow of fluid from reservoir 12 to test chamber 15 depends upon the level of vacuum or underpressure achieved by vacuum pump 38. Note also that typically in an apparatus of this type, an overpressure of about 1 psi above standard atmospheric pressure on level 23 of the cryogenic fluid is maintained. This means that a very small amount of vacuum provided by pump 38, combined with the overpressure above cryogenic fluid 12, will cause fluid flow from the reservoir through the capillary tube and conduit 16 into test chamber 15. The level of vacuum provided by pump 38 is a critical aspect of the present invention as will become apparent herein. When a relatively small amount of heat is applied to capillary tube 13, cryogenic fluid flows through that tube and through coupling tube 16 and coils 17 and 21 into test chamber 15 in a gaseous phase only. Although in the heated capillary tube the temperature will be at or above 4.2 K., as the gas passes through tube 16 and coil 17 in fluid reservoir 12 it is cooled so that the temperature of the gas entering test chamber 15 will be approximately 4.2 K. At that point, heating element 22 can raise the temperature of the gas in the test chamber to any desired level, even as high at 400 K., which is above room temperature.

As described in U.S. Pat. No. 4,848,093, where it is desired to conduct the test at about 4.2 K., neither heater element 14 nor 22 is energized and a very low level of vacuum is applied to pump 38 so that cryogenic fluid in liquid form passes through capillary tube 13 and coupling tube 16 on into test chamber 15, all at approximately 4.2 K. Theoretically, this can provide continuous test temperatures at 4.2 K. for as long as desired. In actuality, it is very difficult to maintain cryogenic fluid at the boiling point without significant discontinuities in temperature resulting from transitions between the liquid and the gaseous states. The present invention provides means for controlling test chamber temperature to any desired level without discontinuities.

Finally, when it is desired to achieve temperatures in the test chamber below 4.2 K., cryogenic fluid in liquid form passes through capillary tube 13 and coupling tube 16 into test chamber 15 and a volume of that liquid builds up in the test chamber. When the volume of cryogenic liquid has accumulated in this test chamber in the desired amount, relatively high heat is applied through heating element 14 so that the liquid within capillary tube 13 immediately boils in such a manner that a restrictive bubble effect or a vapor lock occurs and flow of liquid is completely cut off from the test chamber. There will be a small residual flow of gaseous cryogenic fluid through the capillary tube, but it will be a tiny fraction compared with the volume of fluid that was passing through in the liquid form, as much as a 200-fold reduction. The pressure within test chamber 15 is reduced as much as necessary to reduce the boiling point of the liquid therein to the temperature desired, as low as 1.5 K. It is even possible that, with a relatively massive pump (such as a diffusion pump) in place of the mechanical pump 38, the boiling point could be reduced to as low as 1.3 K., but that is for most purposes impractical. For low temperature operation, as long as there is cryogenic fluid in liquid form in the test chamber, the test can continue at temperatures below the atmospheric boiling point (4.2 K.) of the cryogenic fluid. When the liquid cryogenic fluid is exhausted in test chamber 15, the test must be interrupted and the test procedure described above recycled.

Figure 2:
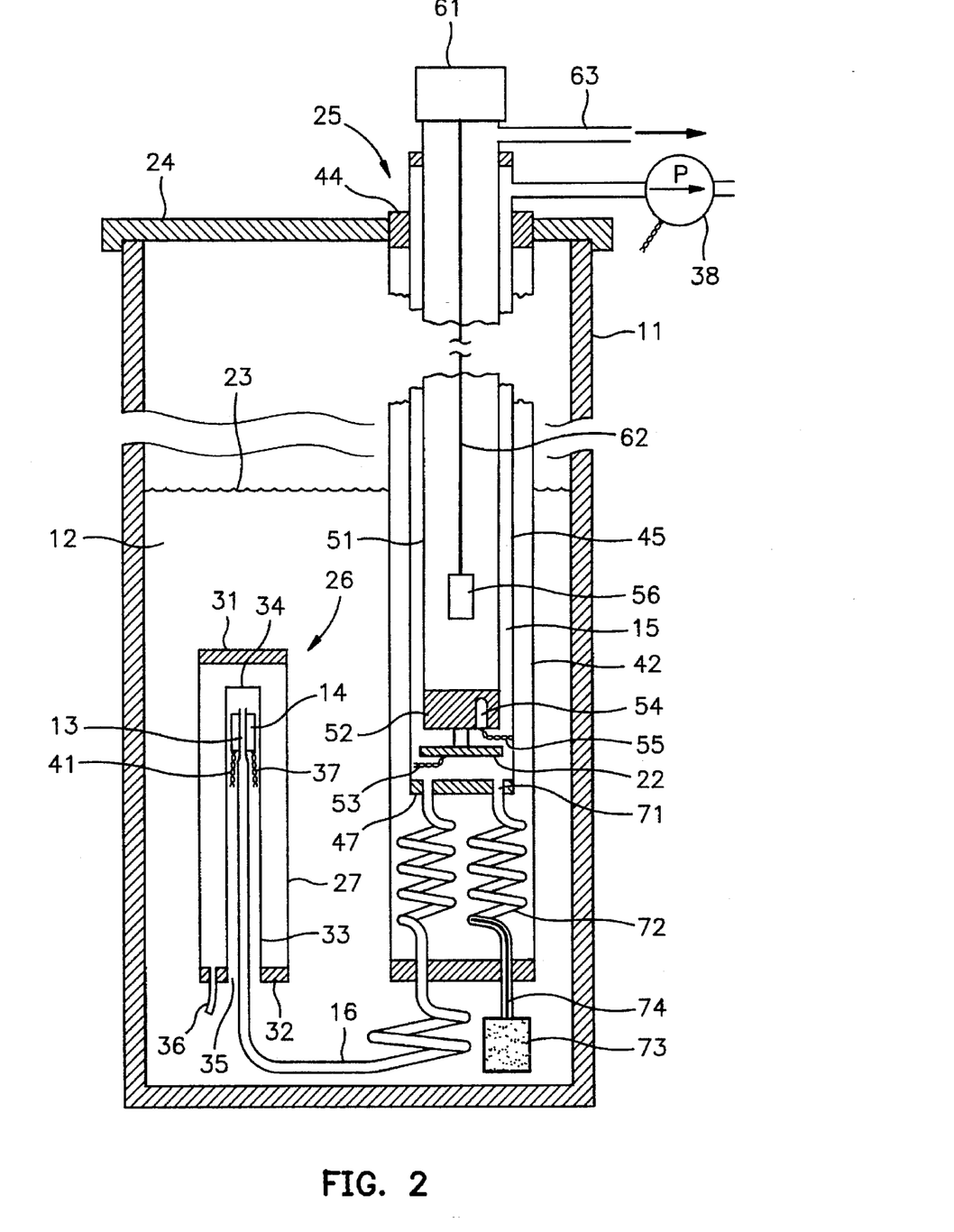
FIG. 2 is a sectional view of the apparatus of this invention.

With reference now to FIG. 2, the dual capillary inlet configuration of the present invention will be discussed in detail. In addition to appropriate additional control functions which will be described with respect to FIG. 3, the structural difference relates to a second capillary tube inlet as shown in the lower right hand portion of FIG. 2. The structure previously described with respect to FIG. 1 is all incorporated in the FIG. 2 apparatus so that structure will not be further described except in its functional aspects in conjunction with the improved structure and operation of the present invention.

The dual capillary inlet configuration of FIG. 2 enables a constant supply of cryogenic fluid to enter the test chamber in gaseous or liquid phase, as appropriate for the particular temperature operation, and the desired temperature in the test chamber to be quickly and accurately achieved and precisely maintained. The steady state situation is that an overpressure of about 1 psi above the reservoir surface 23 exists as a normal condition. This lower level underpressure in test chamber 15 does not materially affect the normal boiling point of the cryogenic fluid. Appropriate adjustments are made to the level of vacuum provided by pump 38 and heating elements 14 and 22 to provide the entire range of functional operation of the present invention apparatus of FIG. 2 as has been mentioned previously. Pump 38 includes valves, which are adjusted to vary the applied level of vacuum, rather than varying the speed or other operating characteristics of the pump itself. Reference to pump 38 includes the integral valving arrangement.

The upper or outlet end 71 of second thermally insulated capillary flow impedance tube 72 connects into test chamber 15. Only an insignificant portion of the lower end of impedance tube 72, plus inlet filter 73, are immersed in cryogenic reservoir 12. The filter is preferably comprised of sintered copper felt and has a 5µ particle removal size, for example. This filter only has a mechanical function in preventing the possible plugging of the impedance inlet, that is, capillary tube 72, by frozen air or hydrogen or other particulate matter which could interfere with the flow of fluid in tube 72 if it opened directly into fluid reservoir 12. Tube 72 may be 101 mm long or longer, from filter 73 to entrance 71 into test chamber 15. The diameter of this second impedance capillary tube conduit is the same as that of capillary tube 13, namely about 0.1 mm. However, this is formed as a substantially higher flow impedance by the insertion of a wire 74 having an outer diameter of 0.075 mm within a 18 mm or longer portion of tube 72. This leaves a passage of only about 0.025 mm in cross section, much smaller than the 0.1 mm of capillary tube 13. The size of the low temperature capillary inlet 72 must be chosen to allow sufficient refrigeration to balance the heat load coming into the test chamber which is permitted by capillary tube 13 even when highly heated and essentially blocked for test temperatures below 4.2 K. If the impedance is too large, there will be insufficient refrigeration and no liquid will accumulate in the reservoir of the test chamber. If the impedance is too small, more liquid than is required will flow into the test chamber, thereby preventing the lowest temperatures desired from being reached.

In operation, at higher temperatures, above 4.2 K. as stated previously, the underpressure within test chamber 15 provided by pump 38 is at a relatively low level, enabling the cryogenic fluid in its gaseous phase to easily be pulled through capillary tube 13 and coupling tube 16 into the test chamber. Because of the high impedance of capillary tube 72 and the fact that only cryogenic fluid in its liquid phase will pass through this high impedance inlet, substantially no liquid cryogenic fluid will enter test chamber 15 when the apparatus of the invention is operating at higher temperatures.

For low temperature operation, below 4.2 K., capillary tube 13 is all but completely shut off by the relatively high temperature (about 300 K.) applied to it which causes a vapor lock due to a rapid and complete boiling of any cryogenic fluid in contact with it. To operate at low temperature levels, it is necessary to apply a relatively high level of vacuum, as high as 1 mm of mercury or better, or 0.01 psi absolute pressure. Because of the relative high impedance of capillary 72, the maximum liquid helium flow rate for this example is about 400 cc/min. As long as the high level vacuum is maintained, liquid cryogenic fluid will flow through high impedance capillary 72 and temperatures as low as 1.5 K. can be achieved and maintained indefinitely in test chamber 15. With such a high level of vacuum the cryogen temperature in tube 72 will be well below 4.2 K. Since the cryogen in tube 72 is not exposed to reservoir 12 the cooled liquid does not become elevated to 4.2 K.

When it is desired to maintain the test chamber temperature at about the critical point of 4.2 K., the vacuum level maintained by pump 38 is only slightly smaller than the 1 psi pressure maintained over standard atmospheric pressure in the reservoir. For purposes of maintaining the temperature at about 4.2 K., a level of vacuum of about 736 mm of mercury or 14.23 psi is applied. This permits liquid cryogen to be pulled through high impedance tube 72 without effectively causing a lowering of the boiling point of the liquid so that continuous operation at 4.2 K. can be maintained. This assumes that the variable impedance capillary tube 13 is maintained in its shut-off mode for all temperatures below 4.2 K. As has been noted previously, even in the shut-off mode, there is a slight leakage of gaseous cryogen through capillary tube 13 so there is a liquid helium loss rate which is determined by the heat leaking into the test chamber through coupling tube 16 and capillary tube 13. The low temperature, high impedance inlet 72 permits that dominant heat load in the test chamber to be counterbalanced by continuously drawing cold liquid helium from cryogenic reservoir 12. The liquid from reservoir 12 at a pressure differential of about 1 psi is isenthalpically expanded through impedance 72, thereby arriving in the test chamber at a lower temperature than 4.2 K. of the reservoir. Note that the cryogen reservoir in test chamber 15 will continue to fill under these conditions until heat transferred from main reservoir 12 through this column of liquid, plus the heat from the apparatus (it is warmer near the top outside of the cryogen bath), just balance the cooling power of the refrigerator available from the latent heat of evaporation.

The structure described above with respect to FIG. 2 enables operation of the cryogenic test chamber of this invention continuously at any desired temperature within its range of about 1.5 to 400 K. without significant temperature variation over an indefinite period of time. Additionally, the test chamber may be cycled through any temperature region within the entire range of 1.5 to 400 K. That is, if it is desired to perform a magnetic measurement test on a sample by smoothly varying its temperature between 3 K and 50 K., for example, this apparatus can do that.

Figure 3:
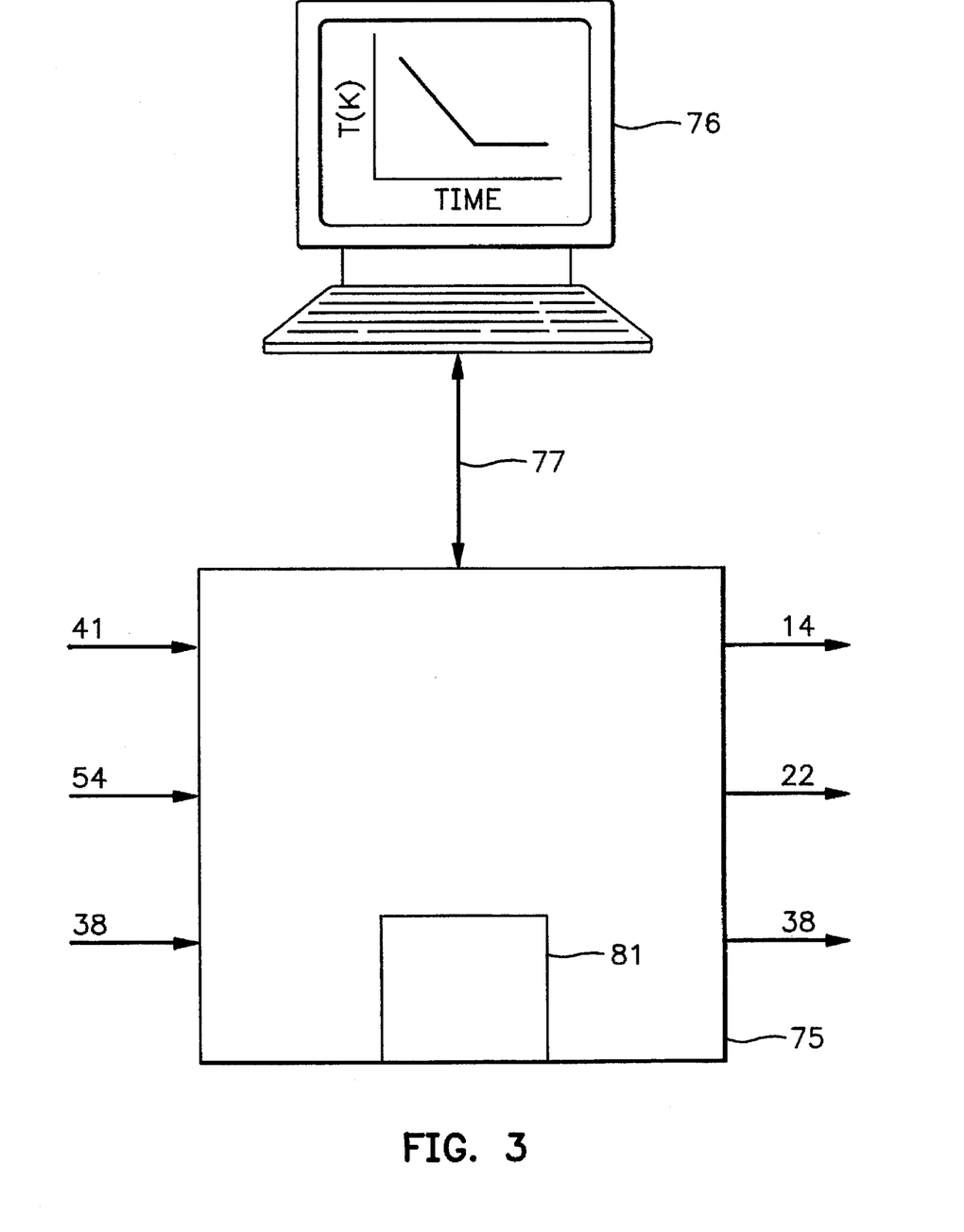
FIG. 3 is a simplified schematic diagram of the control portion of the invention and showing electrical connections to the electrical components of the apparatus of FIG. 2.

The control apparatus of FIG. 3, together with the structure of FIG. 2, enables tests to be accomplished which have not been previously available by any cryogenic test apparatus known in the prior art. Control 75 in FIG. 3 is preferably a multi-channel, microprocessor-based, programmable measurement and control apparatus (commonly referred to as an R/G bridge). In general terms, control 75 is capable of precise measurement and control of temperatures using different types of temperature sensors over a wide dynamic range. As an example, and as a preferred embodiment, control 75 incorporates two 15-watt output control channels regulated externally by two independent proportional-integral-derivative (P.I.D.) based software controllers. A full computer type system 76, linked to controller 75 via appropriate interface 77 (such as a GPIB interface) is typically employed to run the P.I.D. based temperature control software and provide a user interface to accomplish the desired purposes of the embodiment of FIG. 2. The presence of host computer 76 in the control system of FIG. 3 allows easy storage and manipulation of user commands, P.I.D. time constants, gains and other process variables. The two 15-watt control channels in control 75 commonly regulate heater 22, pump 38 and valves using feedback information collected by thermometer 54 accomplishing commands received through link 77 from the user. Extensive firmware resident in memory (ROM) 81 within control 75 allows complex control systems to be configured using a simple, but powerful set of executive commands normally delivered through link 77 by the control software resident in computer 76. Thermometer 54 calibration files (temperature readings corresponding to thermometer resistance values) are stored within memory 81 allowing for translation from resistance to temperature to be accomplished within control 75 prior to effective temperature control accomplished by the P.I.D. based software resident in computer 76. This design significantly enhances the overall control response of the system because the control P.I.D. based software resident in computer 76 is not affected by non-linearities in resistances commonly associated with thermometer 54 temperature responses. In practice, the ability of a linear input delivered by control 75 through link 77 on the temperature feedback readings allows for tighter control loop regulation by control software resident in computer 76. As explained later, this configuration allows, for example, the embodiment of FIG. 2 to sweep smoothly the control temperature within any sub-segment of the temperature range of the apparatus.

In the present invention the control system provides the ability to smoothly transition across 4.2 K., and indefinitely maintain any temperature above, at or below 4.2 K., without the need of an intermediate state which is frequently required by prior art systems to collect liquid in the test chamber. As noted above, the intermediate state was necessary in the prior art to achieve lower temperatures and, in general, to maintain stability below 4.2 K. In practice, as seen by a plot of temperature versus cooling time in FIG. 4, intermediate state 85 would typically persist for several minutes (10–20 min) in which software and hardware changes would be made to initiate the low temperature control mode. The low temperature mode consists of a state in which a reduced gaseous flow of cryogen in test chamber 15 is achieved together with establishment of high vacuum levels. At the end of this intermediate phase the control system would then apply the appropriate vacuum level to achieve the desired target temperature as read by the thermometer 54. However, because of the long time required to achieve the required hardware and software settings appropriate for the low temperature mode, temperature oscillations 91 (FIG. 5) causing thermal instabilities are problems commonly encountered when trying to regulate temperature right at 4.2 K. and, in general, when trying to smoothly switch between the low and high temperature modes. This is because the apparatuses used in any known prior art were intrinsically unable to quickly regulate the amount of liquid present in test chamber 15 and effectively use its cooling power to smoothly transition from high to low temperatures.

In the present invention, these shortcomings are obviated by eliminating the need for a dedicated or intermediate state to collect liquid in the test chamber. When the lower temperature mode of operation is to be accomplished, a higher level of electrical current will be supplied to heating element 14, and feedback sensor 41 will indicate when a predetermined high level, such as 300 K., has been achieved. As stated previously, this operation effectively cuts off the flow of liquid cryogen through capillary tube 13 and coupling tube 16 to the test chamber. This operation, in addition to providing means for quickly varying the helium flow (less than 30 seconds) needed for the establishment of high vacuum levels in test chamber 15 required by the low temperature operating mode, through the use of the dual impedance apparatus described in FIG. 2, produces a constant supply of cold liquid providing the cooling power needed to establish temperatures below 4.2 K. The liquid collected through high impedance capillary 72 is thermally isolated from helium reservoir 12 and will arrive at the test chamber at the desired reduced (below 4.2 K.) temperature. A stable environment is therefore maintained at all times, as the temperature is lowered through 4.2 K., by automatic collection of liquid helium in the test chamber by means of high impedance capillary tube 72. For temperatures less than 10 K. the flow through high impedance capillary 72, restricted by wire 74, alone is sufficient to provide cooling to regulate any temperature in the low temperature mode. This enables the user to smoothly transition temperature in either the cooling or warming mode through 4.2 K. as seen in FIG. 6.

In this low temperature mode, depending upon the temperature desired, adjustments are made to the valve regulating the vacuum level established by pump 38. If the operating temperature is to be approximately 4.2 K., the vacuum level at pump 38 will not exceed about 736 mm of mercury. If the temperature level at which tests are to be conducted is approximately 1.5 K., then the vacuum level will be increased to about 1 mm of mercury or better. Of course, control 75 constantly has feedback on the level of vacuum. As stated above, the highest level of vacuum would be less than 1 mm of mercury, whereas equilibrium at about the boiling point of $^4$He would be relatively low, at about 736 mm of mercury.

When operating in the high temperature mode, that is, above 4.2 K., an appropriately small electrical current is sent to heating element 14 and, at the same time, the temperature of capillary tube 13 is read by means of sensor 41. It would generally be desired to raise the temperature of the capillary tube to about 10 K. which is high enough to boil the liquid as it flows through the capillary tube but not so high as to significantly reduce the rate of mass flow therethrough. This temperature is conveniently maintained by using for temperature sensor 41 a material such as a resistance wire which conducts an electrical current in a superconducting mode at any temperature less than about 10 K. With such a wire, when in the superconducting mode, the electrical resistance of the sensor drops to approximately zero and control 75 determines the temperature of capillary tube 13 by determining whether or not sensor 41 is in its superconducting mode. This provides cryogenic fluid in gaseous form to test chamber 15, drawn therein by the underpressure created by pump 38, the level of which is precisely controlled by control 75. Note that the signal to pump 38 includes a feedback signal from pump 38 which provides constant information as to the level of vacuum provided. As stated previously, when operating in the high temperature mode where gaseous cryogen is continuously provided to test chamber 15, the vacuum level is quite low, close to about 760 mm of mercury, effectively operating solely on the 1 psi overpressure maintained in the helium reservoir resulting in a flow rate of about 200 cc/min. of helium gas. Thermal sensor 54 provides input signals to control 75 and electrical current is provided to heating element 22 as shown in FIG. 3. Thus when the desired operating temperature of the test chamber is entered by the operator, control 75 constantly reads the temperature in the test chamber (sensor 54) and provides additional heat through heating element 22 as necessary. Normally during high temperature operation, the vacuum level will be determined as appropriate for providing a continuous supply of gaseous cryogenic fluid to the test chamber and that will not normally be varied, except for cooling to a lower temperature.

When the operator sets the operating temperature at, for example, 2.8 K., the program in control 75 will immediately provide a high current to heating element 14 to cut off cryogen flow through capillary tube 13, will cut off any electrical current to heating element 22, and will actively control in a feedback mode to determine the level of vacuum to be applied by pump 38, such as, approximately 381 mm of mercury or 7.2 psi absolute pressure. If the desired operational temperature is 50 K., heating element 14 would be heated to approximately 10 K. as previously discussed, and the electrical power would be applied to heating element 22 to increase the temperature in test chamber 15 to 50 K., as determined by sensor 54. This is a constant feedback operation so that control 75 supplies current to heating element 22 based upon continuous readings from sensor 54. At the same time, the vacuum level provided by pump 38 remains quite low, close to 760 mm of mercury.

It is possible to operate the apparatus of this invention in a continuous sweep mode between a low point and a high point, for example between 1.5 K. and 100 K. In this mode of operation control 75 maintains temperature regulation at all times with a moving temperature set point ramping smoothly to the target temperature specified by the user by means 77. For example, with a target test temperature of 100 K., there may be many set points computed by control 75 according to the rate of approach (K/min) between 1.5 K. and 100 K. As each set point or milestone is achieved, a new one is established, until the target is reached. Control system 75 uses information collected from temperature sensors 41 and 54 to control the actuators (heaters 14 and 22 and vacuum level established by pump 38 and its valves in the test chamber) to sweep to the target temperature at the user desired rate without the need of any pauses at intermediate temperatures. In practice, control 75 will gradually vary the settings of heater 22 and the vacuum level established by pump 38 by gradually opening the valve regulating its throughput, using feedback information from thermometer 54 required for the establishment of the desired temperature in the test chamber.

A dynamic aspect of control 75 is that variable impedance capillary 13 may be cut off at different temperatures, depending upon the speed of temperature change as it approaches the boiling point of 4.2 K. If the cooling is being accomplished relatively fast (at a rate typically greater than 7 K./min) in the vicinity of 4.2 K., heating element 14 will be increased to the cut off level of approximately 300 K. when test chamber 15 is at about 10 K., as indicated by sensor 54. However, if the cooling cycle is proceeding relatively slowly (at a rate approximately less than 7 K./min), the cut off of capillary tube 13 may occur when sensor 54 registers about 6 K. As stated above the highest vacuum level would be in the range of 1 mm of mercury or better whereas equilibrium at the boiling point of helium would be relatively low at about 736 mm of mercury. If the operating temperature is to be approximately 4.2 K., the flow of liquid through the high impedance inlet will be sufficient to maintain temperature stability with a vacuum level not exceeding about 736 mm of mercury.

To reiterate the operation of the apparatus of this invention, at operating temperatures below the cutoff of capillary tube 13, cryogen in liquid form enters the test chamber almost solely through capillary tube 72 under a relatively high vacuum, depending on how low the test temperature is to be. Above the cutoff point of capillary tube 13, substantially all the cryogen enters the test chamber by means of capillary tube 13 and is in the gaseous state. When in the transitional state cryogen may enter the test chamber through both capillaries.

An important aspect of the invention is the speed by which control 75 can adjust the apparatus of FIG. 2 to achieve or maintain, or both, desired temperatures, or rates of change of temperatures. With the continuous feedback loops, control apparatus 75 takes readings from sensor 54 at the test chamber and adjusts the level of vacuum or the level of heat applied to the test chamber on an instantaneous basis so that target temperatures are maintained within a very close tolerance (typically about 0.5%), or temperature sweeps are made without discontinuities.

While heaters 14 and 22, sensors 41 and 54, and pump 38 are referred to in the singular, any of them may comprise multiple elements if necessary for speed of operation or increased precision. The particular temperatures, pressures and other specifics are given for purposes of example only.

In view of the above description it is likely that those skilled in the art will envision modifications and improvements to this invention. The invention is limited only by the spirit and scope of the accompanying claims, with due consideration being given to a reasonable range of equivalents.

What is claimed is:

1. Apparatus for regulating temperature in a cryogenic test chamber, said apparatus comprising:

a cryogenic vessel adapted to contain a reservoir of fluid in liquid phase at a cryogenic temperature;

means defining a test chamber in the cryogenic vessel;

first fluid flow means defining a fluid flow path between the cryogenic fluid in the interior of said cryogenic vessel and said test chamber, said fluid flow means having an inlet end and an outlet end, the outlet end being in fluid communication with the interior of said test chamber;

a first capillary tube located in said cryogenic vessel and connected between said inlet end of said first fluid flow means and the cryogenic fluid in said cryogenic vessel, said first capillary tube having a first impedance to fluid flow;

capillary heater means in thermal communication with said first capillary tube;

test chamber heater means in thermal communication with said test chamber;

second fluid flow means connected between the cryogenic fluid in the interior of said cryogenic vessel and said test chamber, said second fluid flow means comprising in part a second capillary tube, said second capillary tube being generally isolated from the interior of said cryogenic vessel and having a second flow impedance much higher than said first flow impedance; and evacuation means operative to partially evacuate said test chamber to draw fluid from said cryogenic vessel selectively through said first fluid flow means and said second fluid flow means into said test chamber;

whereby, when said apparatus is in operation, the cryogenic liquid in said cryogenic vessel is maintained at a level whereby said test chamber extends into and is maintained within the cryogenic fluid and said first and second fluid flow means are maintained within the cryogenic fluid in said cryogenic vessel below the surface of the cryogenic fluid.

2. The apparatus recited in claim 1, and further comprising control means connected to said capillary heater means, to said test chamber heater means, and to said evacuation means.

3. The apparatus recited in claim 1, and further comprising first temperature sensor means in thermal communication with said first capillary tube, said first temperature sensor means having an output.

4. The apparatus recited in claim 3, and further comprising second temperature sensor means in thermal communication with said test chamber, said second temperature sensor means having an output.

5. The apparatus recited in claim 4, and further comprising control means connected to said capillary heater means, to said test chamber heater means, to said evacuation means, and to said outputs of said first and second temperature sensor means in feedback arrangements so that said capillary heater means, said test chamber heater means and said evacuation means are controlled in response to said first and second temperature sensor outputs pursuant to temperature end values established in said control means.

6. The apparatus recited in claim 2, wherein said control means comprises means for entering temperature end values to be realized by said second temperature sensor means.

7. A method for regulating temperature in a cryogenic test chamber coupled to a reservoir of cryogenic fluid in a cryogenic vessel, the cryogenic vessel including a first capillary tube having a first heater and a variable first flow impedance coupling the fluid to the test chamber, a second capillary tube having a stable second flow impedance substantially higher than the normal first flow impedance, the second capillary tube coupling the fluid to the test chamber, a second heater in the test chamber, there being an adjustable evacuation device and programmable control apparatus, said method comprising the steps of:

establishing in the control apparatus a target temperature for the test chamber;

activating the evacuation device to establish a predetermined underpressure in the test chamber;

sensing the temperature in the test chamber;

selectively drawing cryogenic fluid into the test chamber through at least one of the two capillary tubes; and selectively actuating the first and second heaters and the evacuation device to achieve and maintain the target temperature.

8. The method recited in claim 7, wherein the target temperature is a range of about 1.5 K. to 400 K.

9. The method recited in claim 8, wherein the target temperature is a segment within the range of about 1.5 K. to 400 K.

10. The method recited in claim 8, wherein the temperature in the test chamber is continuously swept through the range.

11. The method recited in claim 7, wherein the control apparatus varies the underpressure in the test chamber by adjusting the evacuation device.

12. The method recited in claim 7, wherein the test chamber heater is activated to increase the temperature in the test chamber above the boiling temperature of the cryogenic fluid.

13. The method recited in claim 7, wherein the cryogenic fluid is converted to gaseous phase before entering the test chamber when the temperature of the first heater is raised to a predetermined level.

14. The method recited in claim 7, wherein the first capillary tube effectively prevents flow of cryogenic fluid into the test chamber when the temperature of the first heater is raised to a level of about room temperature.

15. The method recited in claim 14, wherein the underpressure in the test chamber is raised when flow through the first capillary tube is effectively prevented in order to draw cryogenic fluid in liquid form through the second capillary tube into the test chamber.

16. The method recited in claim 15, and comprising the further step of reducing the temperature in the test chamber below the boiling point of the cryogen by reducing the underpressure in the test chamber.

* * * * *